April 19, 1938. R. E. REASON 2,114,984
APPARATUS FOR THE DETERMINATION OF THE REFRACTION OF THE EYE
Filed Jan. 23, 1935 2 Sheets-Sheet 1
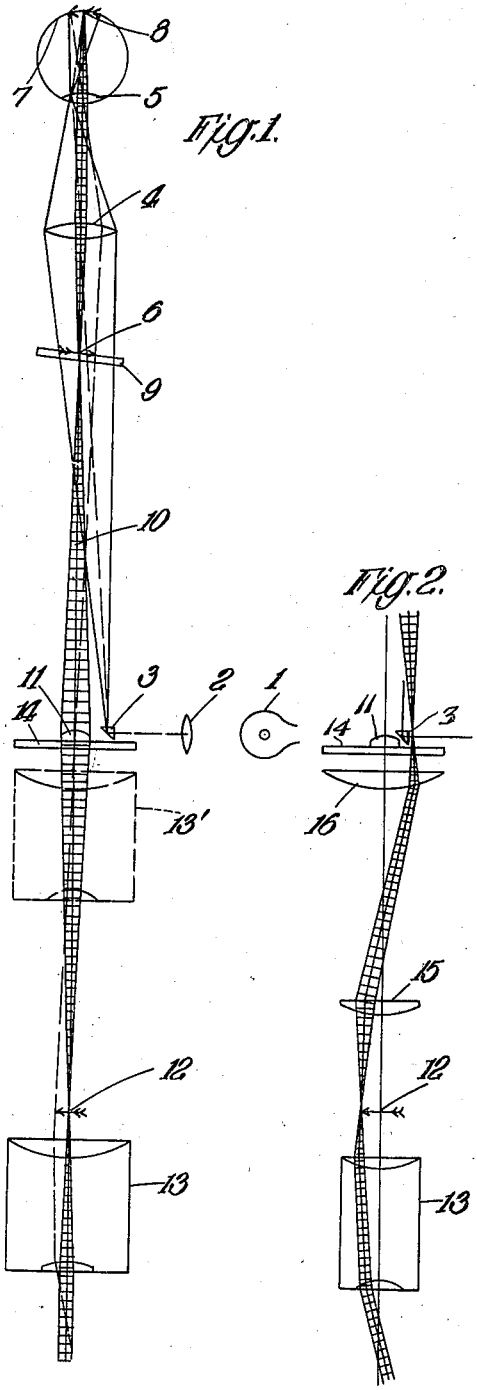
INVENTOR
Richard Edmund Reason
By Arthur S. Kirk
his Attorney

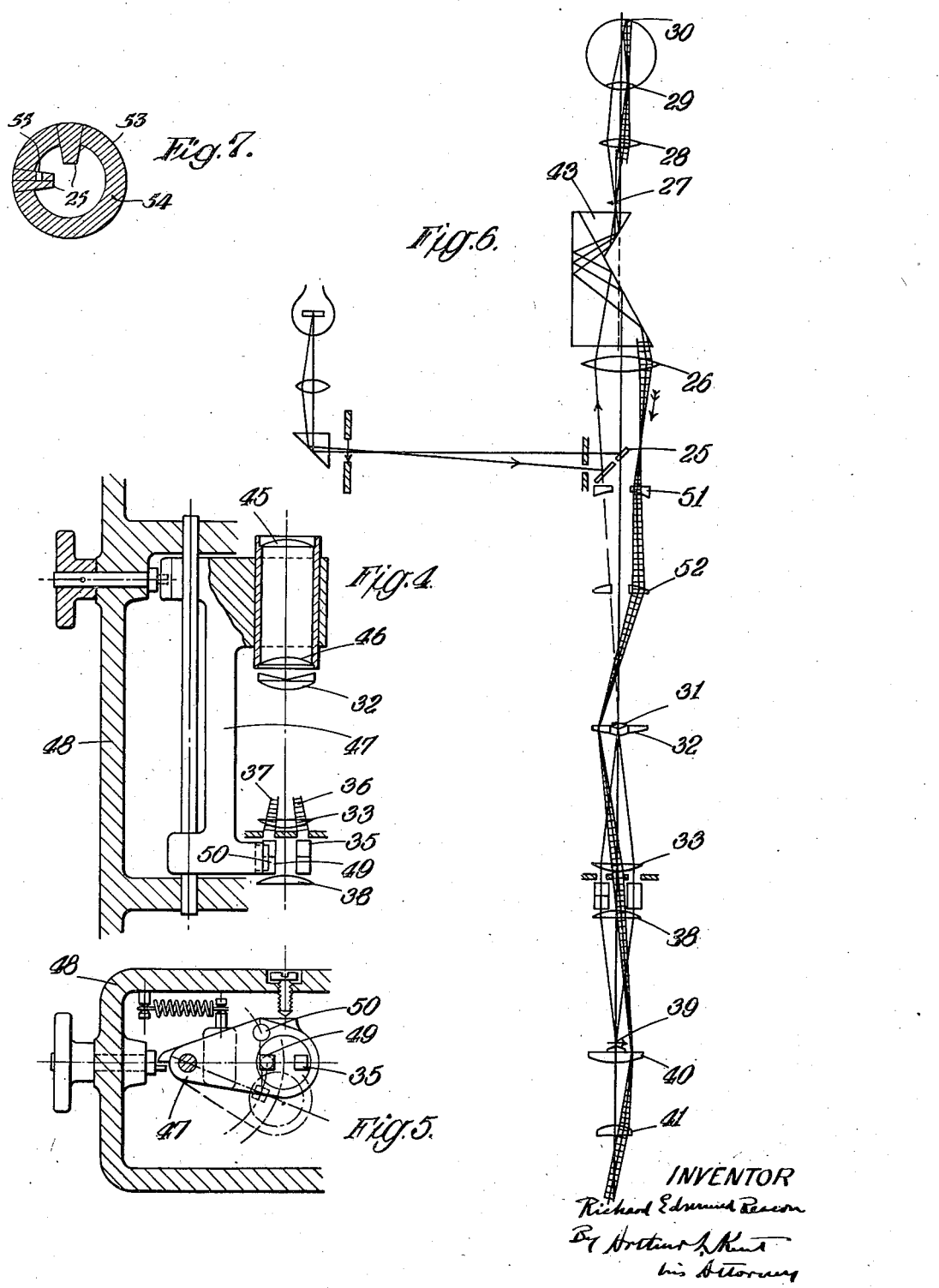

Patented Apr. 19, 1938

2,114,984

UNITED STATES PATENT OFFICE 2,114,984

APPARATUS FOR THE DETERMINATION OF THE REFRACTION OF THE EYE

Richard Edmund Reason, Leicester, England, assignor to Kapella Limited, Leicester, England Application January 23, 1935, Serial No. 3,055
In Great Britain January 29, 1934

4 Claims. (Cl. 88—20)

The present invention relates to apparatus for determining refraction of the eye, of the kind comprising an optical projecting system for forming an image of a target on the patient's retina through an eccentric area of the pupil, and an optical system including an objective and an eyepiece for observing the retina and said image, one of the optical systems being adapted for rotation adjustably about an axis so as to permit measurement in any meridian of the eye. The patient's head is usually held stationary in a headrest and the apparatus is adjustably movable in all directions transverse to the axis of rotation of the system in order that this axis may be centered in the subject's pupil. In order to ascertain whether the aforesaid axis of rotation is properly centered in the pupil it has been usual to look from outside the instrument at the subject's eye to see where the illuminating beam enters the pupil. But since this illuminating beam is eccentric to the pupil and the (concentric) viewing beam is invisible by reason of its extreme weakness, it has not hitherto been practicable to ascertain that the instrument is sufficiently centered for all measurements in all meridians without rotating it into at least three positions before making measurements, and this takes time and in the interval the subject is extremely apt to move and so destroy the adjustment. Furthermore, inaccurate centering can introduce serious errors in the measurement when the eye is afflicted, for example, with spherical aberration or astigmatism.

The principal object of the present invention is to provide means by which these difficulties are overcome. I attain the object of my invention by utilizing the image of the pupil formed by the objective of the viewing system and placing between said pupil image and the image of the retina a lens having conjugate focal points in the images respectively, and I provide a field lens adjacent to an image of the pupil for causing light from the edges of the pupil to emerge from the eyepiece. The lens between, and having conjugate focal points in, the two said images may be mounted for motion in or out of the system as required or it may be fixed, in which case it covers only a part of the light beam sufficient to form a visible image of the pupil, the remainder of the beam being employed to form simultaneously the image of the retina, both images being in the field of the eyepiece.

When the invention is applied to that kind of coincidence refractometer in which an image of the retinal image is divided into two parts and one part is reversed with respect to the other as seen in the field of the eyepiece, the image of the pupil will generally also be divided, and one part reversed with respect to the other, and this confuses the centering operation. To eliminate such confusion we may provide additional means whereby the other part also is reversed.

By an image of the outline of the pupil I mean a sufficient portion or portions thereof to enable the observer to determine when the axis is centered in the pupil. By a sight I mean any device focussed in the field of view and relatively to which the pupil image can be positioned; for example it may be a dot or a series of concentric circles, or mirrors used to reflect the illuminating beam into the eye. The sight must be so positioned in the system that its image formed by the objective system in the plane occupied by the pupil is there centered on the axis of rotation.

The invention will now be described with reference to the accompanying drawings in which:—

Figure 1 shows a known optical arrangement for measuring the refraction of the eye together with means in accordance with the present invention for enabling the subject's pupil to be observed, Figure 2 shows an arrangement which may be used as an alternative to that shown in Figure 1 for observing the subject's pupil, Figure 3 shows apparatus for measuring the refraction of the eye, which is described in greater detail in my Patent No. 2,049,223, issued July 28, 1936, together with means for observing the pupil, Figures 4 and 5 are part sectional side and end elevational views respectively of apparatus for moving auxiliary lenses into and out of an observing system such as is shown in Figure 3, Figure 6 shows a modification of the apparatus shown in Figure 3 whereby images of the retina and pupil may be viewed simultaneously, and Figure 7 shows what is seen through the observing system by the observer.

In Figure 1 there is shown a projecting system comprising elements 1 to 9 inclusive for forming an image of a target upon the retina, a system comprising elements 4 to 11 inclusive for forming images of the retina and pupil and an eye-piece 13 for viewing said images.

Light from a lamp 1 is condensed, by lens 2, upon a reflecting prism 3 provided with a pinhole aperture. A lens 4 is placed so as to form an image of the pin-hole upon the eye-lens 5 and (in conjunction with the eye-lens) an image of a target 6 upon the retina 7 at a position 8. The target 6 may comprise four opaque radial lines upon a glass plate 9 which is disposed so that ghost reflections are deflected to one side of the apparatus.

An image of the retina is formed at the target 6 and the latter can be moved along the axis 10 of the observing system so as to adjust the position of focus of the image 8; when this image 8 is accurately in focus on the retina, the target lines and the image thereof at the target are superimposed and the image apparently disappears. The target and the superimposed image thereof are viewed in a microscope comprising an objective lens 11 (forming an image of the target and retina at 12) and an eye-piece 13. An image of the pupil of the eye-lens 5 is projected into the plane of the objective 11 and illuminating prism 3, the retinal image serving as a source of light. The radius of the projected image of the pupil is somewhat larger than the radius at which the prism 3 is set. The objective 11 may be cemented to the centre of a glass disc or lens 14, forming a bifocal element 11—14. Determinations of the refraction of the eye are made by measuring the distance through which the target 6 has to be moved (from that occupied when focused on the retina of a normal eye) in order to bring the image 8 exactly into focus on the retina.

Now the light enters the eye through a marginal area of the pupil and it is desirable that the distance of this area from the centre of the pupil should remain constant when the apparatus is rotated, and it is further desirable that the area through which the light enters the eye should be ascertained. The position of the axis of rotation must, therefore, be adjusted so that it passes through the centre of the pupil, and to enable the observer to see when this has been accomplished the eye-piece is moved from the position 13 shown in full lines (where it is used to inspect the retinal image) to the position 13' shown in broken lines.

In the position 13 the components of the eye-piece should be adapted to form an image of the subject's pupil on the objective 11, while in the position 13' the subject's pupil should be imaged on the target 6. The powers of the components are chosen to suit the position 13, and any change in power required to suit the position 13' may be provided by the outer zone of the bifocal lens element 11—14. The outer zone will thus have no power when the distance moved by the eye-piece is equal to the distance between the members 11 and 6, and its power will be positive or negative (i. e., collective or dispersive) according to whether the necessary movement of the eye-piece is greater than or less than the separation of the said members.

In the arrangement shown in Figure 2, instead of moving the eye-piece 13 along its axis from the image of the retina to that of the eye-lens, it is kept fixed (except for focusing adjustment) and an auxiliary pupil-sighting lens 15 and a suitable field lens 16 are swung into the observing system; the lens 15 is adapted to form an image of the pupil at the position 12 previously occupied by the image of the retina, so that either of the pupillary or retinal images may be viewed, alternatively, through the single eye-piece 13.

The lenses 15 and 16 are so positioned and proportioned that the light proceeding from the illuminated area of the retina forms an image of the pupil of suitable size and finally passes through the observer's pupil; to assist in centering the image in the eye-piece 13, the element 14 may have concentric rings or the like marked thereon. Since an enlarged image of the pupil is formed, the pupil-sighting lens 15 is similarly adapted to focus an enlarged image in the eye-piece 13, and the plate or graticule 14 is mounted at the enlarged image so that the graticule is visible only when the auxiliary lenses are in their operative position. In apparatus where the light forming the retinal image is introduced through a marginal zone of the pupil by means of a prism or the like, (as shown) and particularly where the radius of the zone may be adjusted by displacing the prism, the auxiliary lenses and the prism are so positioned that, when the lenses are inserted, the prism is seen apparently superimposed on the pupil.

The auxiliary lenses may be mounted in a frame hinged within the apparatus and brought into or out of position by a lever or the like.

Figure 3 illustrates the invention as applied to the type of instrument for measuring refraction which is described in Patent No. 2,049,223, issued July 28, 1936. In this arrangement light from a source 17 is condensed, by lenses 18 and 19, upon a target 20 in the form of a slit. Light from the slit passes, after reflection at a prism 21, through one or other of two slots (one of which is shown at 22), disposed at right angles so as to form an L, in a plate 23, the slot through which light passes being selected by a rotatable shutter 24. The light is then deviated at a reflector 25 and is focused, by lens 26, to an image 27, and a further image of 27 is formed by lens 28 and subject's eye-lens 29, at 30 upon the retina of the subject's eye. The reflector 25 comprises two perpendicularly disposed radial arms arranged so that by adjustment of the shutter 24 light from one arm or other of the target can be reflected at one or other of the arms and thence through either of two marginal areas 90° away from each other on the subject's pupil. The plate 23 can be moved in its own plane along the bisector of the slots whereby the position of the patch of light on the eye-lens 29 may be varied.

The lenses 26 and 28 are arranged with their focal planes at the reflector 25 and the eye-lens 29 respectively so that parallel light passes between them and an image of the eye-lens 29 is formed coincident with the reflector 25.

The lenses 29 and 28 form an image of the retina at 27 and lens 26 forms an image of 27 at 31. The light rays forming the image 31 are divided, partially reversed and observed (in the manner described in Patent No. 2,049,223, issued July 28, 1936) with the aid of the parts 32 and 41 inclusive, 35 being a reversing prism in one of the divided beams 36, 37 being the unreversed beam and 42 and 41 being a microscope eye-piece.

Thus normal images of the retina are formed at 27 and 31 and a partially reversed image at 39, this last image being viewed in the eye-piece 40, 41. In order to focus an image of the target 20 accurately on the retina the whole of the system within the shaded boundary below the lens 28 is mounted for movement along its axis 42 so that the image of the target 27 may be moved towards or away from the lens 28, the projecting system being in no way disturbed by this movement since parallel light passes between the lenses 26 and 28 and lenses 18 and 19. As before, the refraction of the eye is determined by measuring the distance through which the image 27 of the target has to be moved in order to focus it on the retina. Measurements in various orientations are achieved by rotating a prism 43 about an axis 44 which is parallel to but offset with respect to axis 42 and which passes through the centre of the eye-lens 29, rotation of this prism having the same effect as if the subject's eye were rotated about its center, whilst the whole optical apparatus were kept fixed.

In order to observe the subject's pupil and align the observing system with respect thereto an auxiliary pupil-sighting lens 45 and a field lens 46 are movable into the observing system. The lens 45 has conjugate focal points at 32 and 25 respectively and the lens 46 adjacent to the issue of the pupil formed at 32 by the lens 45 has the power necessary to cause light from the edges of the pupil to emerge from the eyepiece 41. This necessary power is that which in combination with the fixed lens forms an image of the retina in the apertures of the mask 34. When the lens 45 is inserted an image of the retina is formed between 45 and 46; and the function of the field lens 46 is to modify the power of the field lens 32 so that the retina is again imaged on the apertures 34 whose image formed by the eyepiece is the exit pupil of the system. The horizontal arm or arms of the reflector 25 are roof-shaped on their upper sides, one face of the arm being polished to reflect light from the target 20 forwards towards the eye, and the other face serving to scatter part of the light passing through the slit 22 backwards towards the eye-piece 40, 41. On looking through the eye-piece with the lenses 45 and 46 in position, the observer therefore sees (a) the pupil of the eye as a dull red disc 54 illuminated by light scattered back from the retina, (b) the arms of the reflector 25, with which it has to be centered, apparently superimposed in it, and (c) a small bright patch of light 55 on the upper side of one arm which indicates the exact position on the pupil at which the target beam is passing through it; this position can be varied as already described by adjustment of the mask 23. In Fig. 7, 53 represents the outline of the field of view, which is generally faintly visible; and the cross-hatching denotes the parts of the field that are substantially dark as seen by the observer.

With the last described arrangement the image of the eye-lens is seen partially reversed in the eye piece owing to the action of the reversing prism 35 so that it is still somewhat difficult to center the observing system with respect to the eye-lens. This difficulty may be overcome, however, with the aid of the arrangement shown in Figures 4 and 5. As shown in this figure the auxiliary lenses 45 and 46 are mounted in a bracket 47 pivotally mounted in the instrument case 48. In the same bracket is mounted a second reversing prism 49 and a parallel plate of glass 50. The plate of glass 50 is inserted in the second unreversed beam 37 of Figure 3 when the partially reversed image of the retina is being viewed and is designed to compensate for the change in the length of the light path introduced by the reversing prism 35. When it is desired to view the image of the eye-lens the plate of glass 50 is swung out of the observing system and the second reversing prism 49 and lenses 45 and 46 into the observing system, the prism 49 being inserted in the previously unreversed beam 37 so that the whole of the image of the pupil is now reversed and therefore, moves as one image. If desired, of course, the prism 35 may be removed from the observing system when it is desired to view the pupillary image instead of inserting the second prism 37 into the system.

In Figure 6 there is shown the apparatus of Figure 3 modified so that images of the retina and eye-lens may be formed in the same plane and viewed simultaneously through a single eyepiece.

Lenses 29 and 28 form an image of the retina 30 at 27, an image of 27 is formed at 31 by lens 26, the light forming this image passing through central apertures in the reflector 25 and lenses 51 and 52, a partially reversed image of 31 is then formed at 39 in the manner described in Patent No. 2,049,223, issued July 28, 1936, and is viewed in the eye-piece 40, 41. An image of the reflector 25 and the pupillary image super-imposed thereon is formed by the annular lens 52 at 31, 51 being a negative annular lens adapted to refract the rays forming the pupillary image away from the axis so that they may be received by the outer zone of lens 52 and not lost, as would otherwise happen when examining a small pupil. The outer zone of the bifocal lens 32 which alone receives the pupillary image-forming rays, serves as field lens to direct the rays preferably through the central zones of lenses 33 and 38, these lenses together forming a further pupillary image on the outer zone of lens 40. There are thus formed at 39 substantially coplanar images of the pupil or eye-lens and the retina, and these images are viewed simultaneously in the eye-piece 40, 41.

The lenses 51 and 52 may be regarded as bifocal lenses having central zones of zero power.

It will be seen that the portions of the lenses receiving the retinal image rays lie sometimes in annular zones and sometimes in central zones; thus the systems forming images of the eye-lens and retina respectively are interlaced in inner and outer zones. If desired however, one system may be kept wholly within the inner or central zone.

An instrument may be so constructed that the pupil sighting lenses are normally in position for observation of the pupil, and are removable for observation of the retina. Alternatively the eyepiece may be normally fixed on an image of the pupil and the auxiliary lens designed to focus an image of the retina in the position normally occupied by the image of the pupil.

In optical systems as described with reference to Figures 1–6, the pupil sighting system can be and is preferably proportioned so that the image of the target on the retina serves as a source of light for observing the pupil, which then appears in the eye-piece as a reddish coloured disc.

I claim:—

1. Apparatus for measuring refraction of the eye, comprising a projecting system for forming an image of a luminous target on the subject's retina, and an observing system comprising an eyepiece, an objective for forming an image of the retina in the field of the eyepiece and for forming simultaneously with light scattered by the retina from said image thereon an image of the pupil, a lens member between said two images having conjugate focal points in the images respectively, and a field lens for causing light from the edges of the pupil to emerge from the eyepiece.

2. Apparatus as claimed in claim 1, in which the field lens and the lens member having conjugate focal points in the images of the retina and pupil respectively are mounted for motion into or out of the observing system.

3. Apparatus as claimed in claim 1, in which the field lens and the lens member having conjugate focal points in the images of the retina and pupil respectively are fixed in the observing system and each covers a sufficient part of the beam to form in the focal plane of the eyepiece a visible image of the edges of the pupil, and in which the remainder of the beam is used to form simultaneously in said focal plane an image of the retina.

4. Apparatus as claimed in claim 1, which also comprises means for dividing an image of the retina into two parts and reversing one part with respect to the other for the purpose of determining focus and a reversing reflector for re-reversing said part, whereby the two halves of the pupil are seen in the field without reversal of one with respect to the other.

RICHARD EDMUND REASON.